Nov. 3, 1964 R. A. GIBBY ETAL 3,155,772
METHOD FOR MEASURING DATA SIGNAL IMPAIRMENT
Original Filed June 3, 1959 2 Sheets-Sheet 1

R. A. GIBBY
INVENTORS H. KAHL
J. J. MAHONEY, JR.
BY Charles Scott Phelan
ATTORNEY INVENTORS R. A. GIBBY
H. KAHL
J. J. MAHONEY, JR.
BY Charles Scott Phelan
ATTORNEY 3,155,772

METHOD FOR MEASURING DATA SIGNAL IMPAIRMENT

Richard A. Gibby and Henry Kahl, Summit, and John J. Mahoney, Jr., Murray Hill, N.J., assignors to Bell Telephone Laboratories, Incorporated, New York, N.Y., a corporation of New York Original application June 3, 1959, Ser. No. 817,792, now Patent No. 3,057,957, dated Oct. 9, 1962. Divided and this application Feb. 7, 1962, Ser. No. 171,613
8 Claims. (Cl. 178—69)

This invention relates to a method for measuring the impairment of a data signal. The present application is a division of our copending application Serial Number 817,792, filed June 3, 1959, which is now United States Patent 3,057,957.

In data transmission systems information is transmitted in the form of a binary code comprising mark and space signals which are either positive-going or negative-going electrical impulses. Such signals are similar to ordinary telegraph signals but are characterized by bit transmission rates roughly one hundred times higher than telegraph transmission rates. The binary coded information may, in a data system, represent combinations of numbers or letters with only symbolic significance; and these combinations may not, therefore, be directly readable as the ordinary written word.

A data receiver includes means for sampling each data bit and a detector for deciding whether each sample was taken from a mark or a space. However, signal impairments of different types can cause marks to be detected as spaces and vice versa. For example, noise may change the amplitude of a bit sufficiently to cause an error; distortion may change the time phase of a bit with respect to the phase of the receiver sampling operation to cause an error; or a shift, or jitter, in the time of occurrence of the sample-taking operation may also cause errors. Accordingly, it is desirable to know the range of possible signal impairment in a data transmission system in order that system equipment may be designed, maintained, and adjusted to provide adequate operating margins which are consistent with the error rate which the particular system can tolerate. Since the tolerable error rate is the criterion of transmission effectiveness, it would be convenient to measure impairment in terms of the tolerable error rate. There is, however, no convenient way to recognize an error immediately after mark-space detection unless a special error checking circuit is employed or unless the transmitted signal is also reproduced at the receiver by a slave generator for comparison with the received signal.

It is possible to obtain some idea of signal impairment in data systems on a qualitative basis by superimposing upon the screen of a cathode ray oscilloscope the traces of a series of successive data pulses. The traces of superimposed mark and space pulses enclose an area, hereinafter called the data wave aperture, having a size and configuration which are a function of signal impairment due to noise and distortion. If one is observing the screen at the time of an error, a momentary reduction in the size of the aperture will be noted. However, in order to detect errors accurately in such a visual arrangement it is necessary to keep the oscilloscope screen under observation at all times. For this reason, and others, the visual method is not entirely satisfactory for determining the accuracy of mark-space detection in a data system under different conditions.

Accordingly, it is one object of the invention to measure data signal impairment.

Another object is to improve data transmission systems by determining operating margins for the systems and thereby facilitate the design of system components.

A further object is to obtain a quantitative evaluation of a data transmission system.

An additional object is to measure data signal impairment in terms of predetermined data error rates.

These and other objects of the invention are realized in a measuring method wherein a noncyclic data pulse wave is transmitted over a typical transmission medium; the wave is received; and the received wave is probed in a cyclic manner to determine the probability of erroneous signal detection with certain given system components.

An illustrative embodiment of apparatus for carrying out this method includes a particular combinaton of voltage-sensitive gate circuits and counting devices so arranged that only pulses of certain amplitude will be counted. A cyclic sampling voltage generator, which is precisely synchronized with the data pulse wave, actuates the gates for a predetermined time once during each data bit. The sampling time and the gate voltage-passing amplitudes would define a rectangular area, or window, in the aperture of a synchronized oscilloscope trace of the data wave. The window may be altered in size and moved about the aperture by adjusting the sampling time and the gate voltages, and data bit samples which have instantaneous amplitudes lying in the window are counted. If the window is positioned for a sample count which bears a predetermined relationship to the tolerable error rate of the measured system, the voltage dimensions of the aperture can be determined from the gate settings. Certain other characteristics of the data wave can also be determined in a similar manner in terms of specific voltages and specific error probabilities. Features of this illustrative structure are claimed in our previously identified copending application.

A complete understanding of the method for determining data signal impairment in accordance with the invention may be obtained upon a consideration of the following specification with reference to the attached drawings in which.

Figure 1:
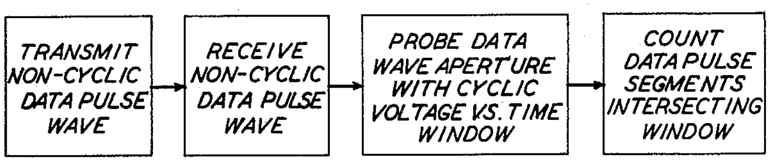
FIG. 1 is a diagrammatic representation of the steps of the method of the invention.

Referring to FIG. 1, the steps of the signal impairment measuring method in accordance with the invention include transmitting a noncyclic data pulse wave over a suitable transmission medium; receiving the same wave as altered by such transmission factors as noise, delay, and attenuation; probing the data wave aperture with a voltage-versus-time window; and counting data wave segments which intersect the window.

Figures 2, 3:
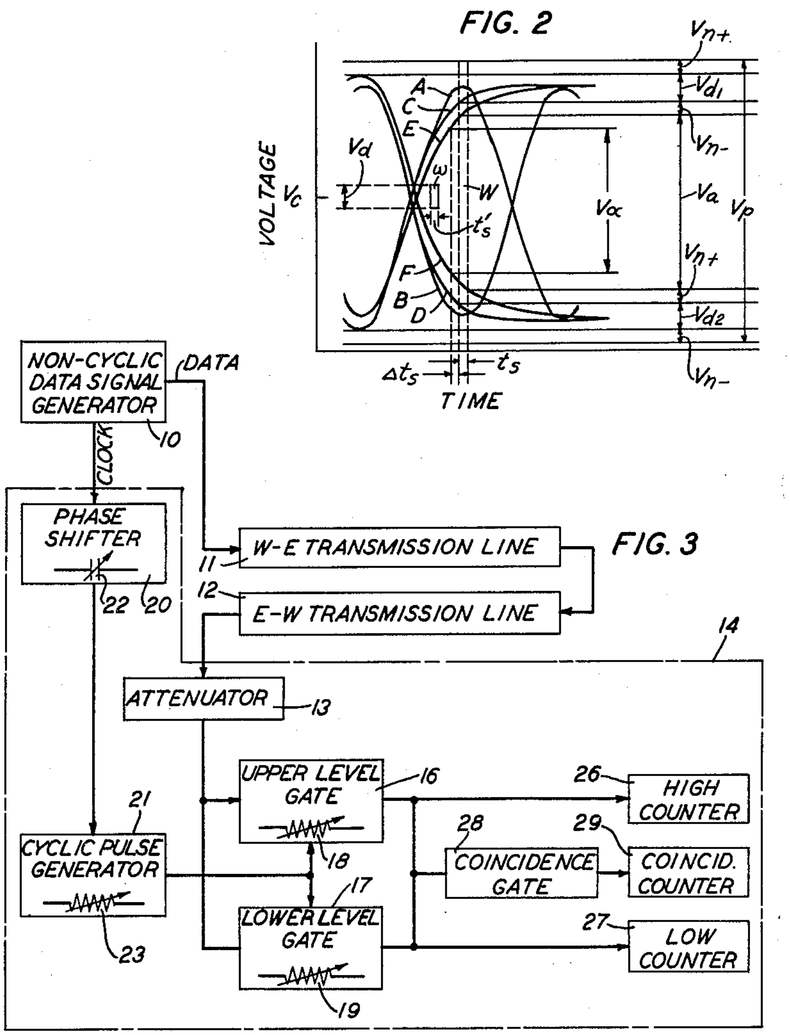
FIG. 2 is a simplified oscillogram of some superimposed data impulses for facilitating an understanding of the invention.
FIGS. 3 and 4 are block and line diagrams of different embodiments of apparatus for carrying out the invention.

The received data wave, if applied to a properly synchronized cathode ray oscilloscope, might present traces similar to the simplified traces illustrated in FIG. 2 wherein traces A and B represent, during a sampling interval $t_s$, reference mark and space traces, respectively. That is, traces A and B are traces which are not altered by either noise or distortion. During the same interval traces C and D represent mark and space traces, respectively, which have been altered by distortion only, and traces E and F represent mark and space traces, respectively, which have been altered by distortion plus noise. Voltages $V_{d1}$ and $V_{d2}$ are the voltage ranges through which a data signal may be altered by distortion for some predetermined error probability criterion $\epsilon$. The quantity $\epsilon$ is the ratio of the permissible error rate in a given period of time to the total number of data bits that occur during that same time. Voltages $V_{n+}$ and $V_{n-}$ similarly represent the ranges of plus and minus noise voltage excursions that may alter data signals. The voltage $V_a$ represents the voltage dimension of the data wave aperture during the sampling interval $t_s$. The voltage $V_p$ represents the maximum range of voltage which the data signal does not exceed more than $\epsilon$ percent of the time.

If the sampling interval were shifted $\Delta t_s$ microseconds to the left as indicated in FIG. 2, the aperture voltage would be reduced to the voltage $V_\alpha$. The difference between $V_a$ and $V_\alpha$ is called the jitter voltage $V_j$.

In a typical data receiver (not shown) the mark-space detecting apparatus would be actuated during the sampling interval $t_s$ to determine for each of the data pulses whether the amplitude thereof is above or below a critical voltage $V_c$ which is the nominal amplitude discriminating level of the detector in the data receiver.

In accordance with this invention, the operating margins of the measured transmission system are determined by probing the aperture of the data wave to determine the size thereof. The probing operation is carried out by creating a voltage-versus-time window of predetermined dimensions which can be varied in size and which can also be moved about as desired to scan the data wave aperture and determine the largest aperture for a given number of wave segments intersecting the window. For some purposes a large window W with the dimensions $V_a$ and $t_s$ may be utilized and for other purposes a small window $w$ with the dimensions $V_d$ and $t_s'$ may be utilized. The number of data pulse waveforms which intersect the window in each location in a given period of time is counted, and the total count is utilized, together with the probing window location, to indicate the aperture size. The measuring method of the invention is hereinafter described in greater detail in connection with two different apparatus arrangements, called bidiameters, for carrying out the method. The word "bidiameter" is a shortened form of the phrase "binary digital aperture meter."

Referring to FIG. 3, one apparatus arrangement includes a signal generator 10 for producing a noncyclic data pulse wave which is applied to a west-to-east transmission line 11. The receiving end of the line 11 is coupled directly to the transmitting end of an east-to-west transmission line 12 to perform the measurements on a loop basis. The same measurements can also be performed on a straightaway basis as will be hereinafter described in greater detail. The receiving end of the line 12 is coupled to an attenuator 13 in the input of a bidiameter 14. The output of attenuator 13 is coupled to the common input of two gate circuits 16 and 17. Gate circuit 16 is an upper level gate and is designed in a well known manner to be responsive to the simultaneous application thereto of a conditioning pulse and a further pulse having an amplitude which is less than a first predetermined amplitude $V_1$ for producing an output voltage pulse. Gate 17 is a lower level gate and is designed in a well known manner to be responsive to the simultaneous application thereto of a conditioning pulse and a further pulse having an amplitude which is greater than a second predetermined amplitude $V_2$ for producing an output voltage pulse. The voltage $V_2$ may be either greater or less than $V_1$ depending upon the particular mode of operation of the bidiameter. The responsive levels of gates 16 and 17 may be adjusted as desired, and this fact is schematically represented in FIG. 3 by including adjustable resistors 18 and 19 within the respective blocks representing the gates. The adjustment of resistors 18 and 19 establishes the voltage boundaries of the voltage-versus-time window W employed to probe the data wave aperture. Thus, the size of the window can be adjusted and the position of the window in the voltage direction can also be adjusted.

The output of signal generator 10 includes, in addition to the noncyclic data signal, a cyclic clock voltage wave which is employed within the generator for defining the duration of mark and space intervals as is well known in the art. Further in accordance with this invention, such a clocking voltage is applied from generator 10 to a phase shifter 20 in the bidiameter 14. The output of phase shifter 20 is coupled to the input of a cyclic pulse generator 21. Phase shifter 20 is adjustable as indicated schematically by the variable capacitor 22 which is included within the block representative thereof. The adjustment of capacitor 22 shifts the position of the probing window in the time direction.

Generator 21 produces a train of cyclic pulses for application to gates 16 and 17 in synchronism with the phase shifted clock voltage wave. The duration of each output pulse from generator 21 corresponds to the duration of the sampling time interval $t_s$ indicated in FIG. 2. The duration of the sampling pulses is adjustable in a well known manner as schematically represented by the adjustable resistor 23 which is within the block representing generator 21. Adjustment of resistor 23 establishes the time boundaries of the voltage-versus-time probing window W.

The output of gate 16 is coupled to the input of a counter 26 to produce an indication of the number of data pulse samples having amplitudes which are less than the high voltage limit of the probing window. The output of gate 17 is coupled to the input of a second counter 27 which produces an indication of the number of data pulses having amplitudes which exceed the low voltage limit of the probing window. In addition, the outputs of both gate 16 and gate 17 are applied to the input of a coincidence gate 28 which has the output thereof coupled to a third counter 29. If more convenient, of course, a single counter could be employed with appropriate switches for connection to any one of the gates 16, 17 or 28. Counter 29 produces an indication of the number of data pulses which have amplitudes of sufficient magnitude to actuate both counters, i.e. peak amplitudes which lie between the voltage limits of the probing window W.

Considering now one aspect of the operation of the apparatus in FIG. 3, the resistors 18 and 19 are adjusted to produce a probing window W of a desired amplitude, such as $V_a$. That is, the critical response voltage of gate 16 is adjusted so that this gate can be actuated only by data peak voltages which are less than the upper voltage level of aperture voltage $V_a$. The critical response voltage of gate 17 is adjusted so that gate 17 can be actuated only by data voltages which are greater than the lower voltage level of aperture voltage $V_a$. Resistor 23 is adjusted to fix the width of window W by setting the duration of the sampling pulses from generator 21. Capacitor 22 is adjusted to position the window W at the desired point in the data wave aperture by shifting the time phase of the clock frequency voltage with respect to the data wave prior to the application thereof to generator 21.

The noncyclic data signal from generator 10 is applied via the transmission lines 11 and 12 and the attenuator 13 to one input of each of the gates 16 and 17. The clock voltage is applied via phase shifter 20 to actuate the cyclic sampling pulse generator 21 for producing sampling pulses of $t_s$, microseconds duration at a predetermined time during each successive data bit. The sampling pulses are applied in multiple to a second input of each of the gates 16 and 17 to condition the gates for actuation in response to certain data pulse amplitudes as hereinbefore noted. Data bits having sample amplitudes which are less than the lower voltage limit of the probing window W actuate gate 16 only, and gate 16 produces an output to drive the counter 26. Samples which exceed only the lower voltage limit of the probing window W actuate both gate 16 and gate 17, and these gates drive counters 26 and 27, as well as the coincidence gate 28 and counter 29. Samples which exceed both voltage limits of the probing window W actuate gate 17 only, and only counter 27 is operated. When the voltage levels on the gates are adjusted such that the counts on counters 26 and 27 are equal for a given period of time, it is then known that mark and space bits are making approximately equal contributions to the total number of traces intersecting window W. The count indicated on counter 29 during the same interval indicates the amount of impairment produced by the particular transmission factors, or, stated differently, the count is an indication of the error rate that can be expected in the measured system if the system relies upon the utilization of the entire window height corresponding to the voltage $V_a$.

By adjusting the critical response voltages for gates 16 and 17, it is possible to obtain different relations between the counts indicated by the respective counters 26, 27, and 29 to indicate different characteristics of the data wave as will be hereinafter described in greater detail. Likewise, the position of the probing window can be moved about as hereinbefore described to explore the size of the data wave aperture. Such exploration determines the size of the aperture with respect to a predetermined tolerable error rate for the measured system. These items of information may then be employed to assess the operating condition of the system to determine whether or not repairs or adjustments should be made. The information may also be employed to establish design requirements for the transmission equipment in order to simplify the equipment and to make maximum use of available operating margins and still produce detected data signals with a predetermined degree of accuracy.

The apparatus of FIG. 3 is adapted for loop measurements as has been hereinbefore noted. Straightaway measurements can be performed if the line 12 is removed from the circuit, the clock voltage which drives phase shifter 20 is supplied to the output end of line 11 via a separate transmission channel, and the bidameter is connected to the output end of line 11.

Once a performance criterion $\epsilon$ has been determined for a particular data system, the single bidiameter 14 of FIG. 3 can be employed to determine:

Total transmission impairment $(TTI)=-20\log_{10}\frac{V_a}{V_p}$ (1)

Noise transmission impairment $$(NTI)=-20\log_{10}\frac{V_p-2V_n}{V_p} \quad (2)$$

Distortion transmission impairment $$(DTI)=-20\log_{10}\frac{V_a+2V_n}{V_p} \quad (3)$$

Timing uncertainty impairment $(TUI)=-20\log_{10}\frac{V_j}{V_p}$ (4)

The various voltages which are indicated in Equations 1 through 4 have been hereinbefore defined in connection with FIG. 2. By way of explanation of the significance of the different impairments, the total impairment TTI would be zero if both the noise and distortion were zero because the aperture voltage $V_a$ would then be equal to the peak-to-peak voltage. The size of the aperture is reduced as impairment increases. Noise impairment NTI is a figure that is indicative of the reduction in operating margin as a result of noise alone. Distortion impairment DTI is a figure that indicates the extent of reduction in operating margin due to such factors as delay and attenuation which exist in the transmission path. The noise, aperture, and peak-to-peak voltages already measured are employed to calculate distortion impairment. Timing uncertainty impairment TUI is an indication of the impairment that may result if the time phase of sampling signals in a data receiver is subject to shift or jitter. The above-listed expressions for impairment can be translated into practical numerical values by means of measurements made with a bidiameter.

First, to accomplish an impairment determination, the desired probability of error $\epsilon$ for satisfactory system operation is decided upon; and then the noise voltages $V_{n+}$ and $V_{n-}$ must be measured. With no signal on the transmission lines 11 and 12, and while receiving noise only, resistor 18 is adjusted so that gate 16 is responsive to samples below a voltage which is less than a zero-signal reference voltage level, and resistor 19 is adjusted so gate 17 is responsive to samples above a voltage which is more than the same reference level. Then each of the resistors 18 and 19 is further adjusted until the output from its associated gate produces pulses to the respective counters in sufficient number to correspond to a performance criterion equal to $\epsilon/2$ for the measured system. The voltage input levels of gates 16 and 17 at which this condition occurs are then equal to $V_{n-}$ and $V_{n+}$, respectively, and the total of these two voltages is $V_n$, the critical noise voltage, i.e. the voltage range through which noise can change the amplitude of a data pulse without increasing the probability of error beyond the probability criterion $\epsilon$ of the measured system.

Next, to determine the peak-to-peak voltage $V_p$, signal is applied to the input of line 11. There appears at the output of line 12 the signal, plus noise, plus distortion. Resistor 18 is adjusted until the count on counter 26 indicates that gate 16 is responsive to a fraction $\epsilon/2$ of the data sample pulses, i.e. until $\epsilon/2$ of the pulses have magnitudes less than the critical response voltage of gate 16. Resistor 19 is similarly adjusted until the count on counter 27 indicates that $\epsilon/2$ of the pulses have magnitudes greater than the critical response voltage of gate 17. The difference between the response voltages of the two gates 16 and 17 is then the voltage $V_p$. By substituting into Equation 2 the values for $V_n$ and $V_p$ just determined the noise transmission impairment NTI can be readily calculated.

To determine aperture voltage $V_a$, resistors 18 and 19 must be readjusted while receiving signals, plus noise and distortion. The criteria for adjustment this time are that the counts shown by counters 26 and 27 must be equal to one another and that the count shown by counter 29 must be equivalent to the predetermined permissible error rate for determining the error probability $\epsilon$. This time the difference between the response voltages of gates 16 and 17 is the aperture voltage $V_a$. Upon substituting this value for $V_a$, and the previously determined values for $V_p$ and $V_n$, into Equations 1 and 3, the values for total transmission impairment TTI and for distortion transmission impairment DTI can be calculated. In the case of total impairment, the indication on counter 29 will be to an experienced operator a direct measure of signal impairment. The higher the sample count indicated by counter 29 in this mode of operation, the greater is the impairment for any given aperture size.

To determine the value of jitter voltage $V_j$, capacitor 22 is adjusted to provide a new sampling interval $\Delta t_s$. The previously described procedure for determining aperture voltage $V_a$ is now repeated to determine the reduced aperture voltage $V_\alpha$ in interval $\Delta t_s$. The difference between $V_a$ and $V_\alpha$ is equal to the jitter voltage $V_j$, the reduction in aperture voltage due to shift, or jitter, in the sampling time. Upon substituting the voltages $V_j$ and $V_p$ into Equation 4 the impairment due to timing uncertainty TUI can be calculated.

Figure 4:
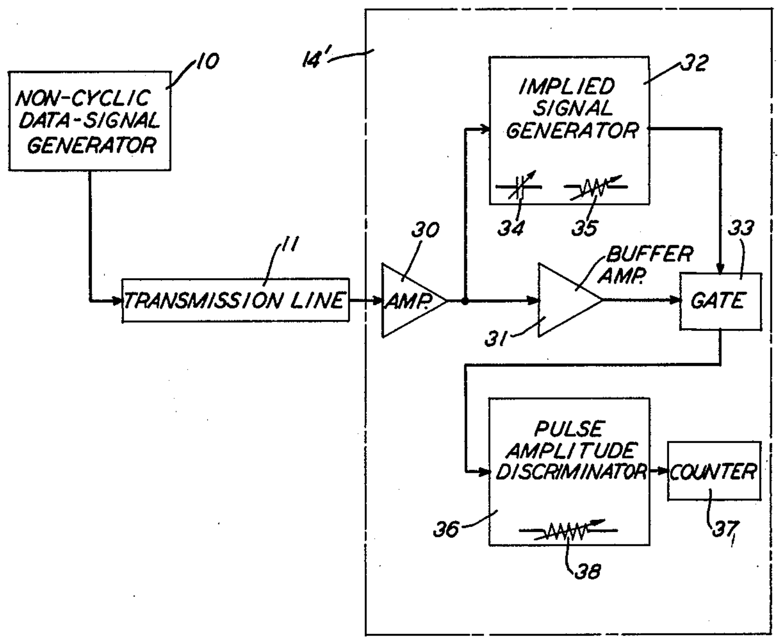

Referring to FIG. 4, the apparatus there illustrated comprises an apparatus arrangement including a second bidiameter 14′ for carrying out the measuring method of the invention on a straightaway basis without employing an extra transmission channel. The apparatus of FIG. 4 is the subject of two related patent applications of D. L. Favin. Application Serial No. 79,775, filed December 30, 1960 now United States Patent 3,049,675, and entitled "Method and Apparatus for Synchronizing Oscillators," is one of the two and is a continuation-in-part of the Favin application Serial No. 817,783, filed June 3, 1959, which is entitled "Data Signal Distortion Measuring Circuit," and which is now United States Patent 3,041,540. Accordingly, the description here will include only enough detail to demonstrate the operation in accordance with the method of this invention. The same noncyclic data signal generator 10 and transmission line 11 are employed in FIG. 4 and in FIG. 3. At the receiving end of transmission line 11, however, the noncyclic data signals are applied via an amplifier 30 to the input circuits of a buffer amplifier 31 and an implied signal generator 32.

Generator 32 is described in full detail in the above-mentioned Favin patents. Briefly, however, this generator includes a nonresonant phase shift oscillator which is characterized in that it can be synchronized by noncyclic applied pulses to oscillate at any one of a plurality of frequencies in a narrow band of frequencies which includes the natural oscillatory frequency thereof. Such an oscillator is additionally characterized in that once it has been synchronized it tends to continue oscillating at the synchronized frequency, in the absence of further synchronizing pulses and with substantially no decrement, for a period of time which is relatively long compared to the period of oscillation at the synchronized frequency. The last-mentioned characteristic results in an output from generator 32 which includes a train of cyclic sampling pulses occurring at the data bit frequency with, for example, less than one electrical degree of jitter in the sampling pulses at a frequency of 50 kilocycles per second. An adjustable capacitor 34 and an adjustable resistor 35 shown in the block representation of generator 32 are schematic representations of the phase shift control and the sampling pulse duration control, respectively, which are included in generator 32 and described in detail in the above-mentioned co-pending application. The sampling pulses are applied from geneator 32 to one input of a gate 33 where they condition gate 33 for the extraction of samples from the received data wave which appears in the output of the buffer amplifier 31.

The output of gate 33 is applied via a pulse amplitude discriminator 36 to a suitable counter 37. Discriminator 36 selects data samples having amplitudes which exceed a first predetermined amplitude but which do not exceed a second higher predetermined amplitude. The aforementioned predetermined amplitudes correspond to the voltage boundaries of the small probing window $w$ illustrated in FIG. 2 and these boundaries may be altered to change the size of the window or to change the position of the window in the voltage direction as schematically indicated by the adjustable resistor 38 which is included within the block representing the pulse amplitude discriminator 36.

There are many forms of pulse amplitude discriminators for performing the above-described functions which are well known in the art. For example, a pair of monostable multivibrator circuits could be driven in parallel from the output of gate 33. Each multivibrator would be biased to be responsive to pulses of a different amplitude. The outputs of the two multivibrators would be combined in a logical NOT-AND circuit with the output thereof connected to counter 37. This arrangement would actuate counter 37 in response to the triggering of one of the multivibrators but would not actuate counter 37 if both multivibrators were triggered.

In order to operate the apparatus of FIG. 4, capacitor 34 is adjusted to fix the location in the time direction of the probing window $w$ within the data wave aperture. Resistor 35 is adjusted to fix the time dimension $t_s'$ of window $w$, and resistor 38 is adjusted to establish the voltage dimension $V_d$ of the window and to fix the location of the window in the voltage direction. A small probing window is employed for this embodiment since the combination of the single sampling gate 33 and the above-described discriminator 36 makes a contour-plotting operation with a single counter more convenient than the large-window, probability-measuring, multiple-counter operation described in connection with FIG. 3.

The noncyclic data wave from generator 10 is transmitted via line 11 and amplifier 30 to the input of generator 32. The output of generator 32 comprises a train of cyclic sampling pulses occurring at the data bit frequency and at a predetermined time during each successive data bit. These sampling pulses condition gate 33 to transmit data pulse samples from the output of amplifier 31 to the input of discriminator 36. Only those samples having peak amplitudes which lie within the probing window $w$ can actuate discriminator 36 in such a way as to operate counter 37. The last-mentioned samples are totaled by counter 37. The total number of counted samples and the information obtained in setting up the apparatus at each location of the probing window can be plotted to provide contours of equal count rate. Signal impairment can be judged by comparing the desired error probability criterion with the contours. In addition, the optimum sampling interval location and the available operating margins can be determined from the contours.

Although the invention has been described in connection with particular method steps and particular apparatus for accomplishing the steps of the method, it is to be understood that additional embodiments and modifications of the method will be apparent to those skilled in the art and are included within the scope of the invention.

What is claimed is:

1. In a system for transmitting positive-going and negative-going voltage pulses of predetermined reference configurations, the method for determining transmission impairment of said pulses in terms of the probability of predetermined voltage excursions from said reference configurations, comprising the steps of transmitting said pulses over a system to be measured, receiving said pulses with their characteristic system transmission impairments, sampling a predetermined voltage range of each pulse at a predetermined time interval thereof, and measuring the probability of data wave excursion with respect to said range during said time interval.

2. In a data system in which the transmitted signal wave comprises mark and space voltage pulses of predetermined duration, which pulses if the traces thereof were superimposed would define a voltage-versus-time aperture, the method for evaluating the extent of data signal impairment during transmission which comprises transmitting said data wave over a system to be measured, receiving said wave with characteristic transmission impairments, and measuring the extent of said aperture in terms of the probability of wave intersections by recurrently sampling predetermined voltage-versus-time portions thereof and then measuring the intersection probabilities for each of said portions.

3. In a signal transmission system in which information detection is accomplished by recurrently sampling a voltage wave and detecting whether the sample amplitude is above or below a certain level, the method for measuring the effect of signal wave impairment upon detection accuracy which comprises the steps of recurrently examining said wave, comparing samples thereof to a predetermined range of voltage amplitudes, and samples outside said range as an indication of the probability of occurrence of voltage wave samples which have amplitudes outside said range.

4. The method for evaluating transmission and detection accuracy in a data system with a predetermined tolerable error rate, said method comprising the steps of transmitting a data signal wave through said system, receiving said wave with characteristic noise and distortion impairments injected during transmission, sampling at recurring intervals an incremental voltage-versus-time portion of said wave, and measuring the rate of data wave intersections of said incremental portion.

5. The method for evaluating transmission and detection accuracy in a data system with a predetermined tolerable error probability, said method comprising the steps of transmitting a data signal voltage wave through said system, receiving said wave with characteristic noise and distortion impairments injected during transmission, sampling the signal voltage during incremental time portions of each of a plurality of recurring time intervals, comparing the signal voltage samples to a predetermined voltage range, and adjusting said predetermined voltage range to determine for each of said incremental time portions the magnitude of said predetermined voltage range required to realize a predetermined probability that pulse samples will occur within said range.

6. The method for evaluating the transmission and detection fidelity of a data transmission system which employs a mark-space amplitude detector, said method comprising, passing a noncyclic clocked data wave through said system, said wave including successive data bits, each bit comprising a voltage pulse having a duration at least equal to the period of the clocking source, recovering the clock frequency from the received data wave, sampling each data bit in the received wave under the control of said recovered clock frequency, comparing the amplitudes of said samples to a predetermined range of voltages, and counting the samples having instantaneous magnitudes lying within said range.

7. The method for testing the suitability of a transmission system for the transmission of mark and space data pulses comprising the steps of transmitting data pulses through said system, receiving said pulses, recurrently sampling a predetermined time portion of each of said pulses, selecting the pulse samples having instantaneous amplitudes between first and second predetermined amplitudes, and counting the selected samples.

8. The method for evaluating signal detection impairment in a given binary voltage transmission system due to shifting in the time phase of the detector sampling operation, which method comprises the steps of transmitting said binary voltage wave over said system, receiving said voltage wave with characteristic transmission impairments, measuring the probability of voltage wave intersection of a predetermined voltage range during an incremental recurring time period, shifting the phase of said incremental time period, and measuring the changes in the boundaries of said voltage range which are necessary to obtain the same intersection probability.

References Cited in the file of this patent

UNITED STATES PATENTS 2,856,457 Prior et al. ______________ Oct. 14, 1958
2,938,077 Holland et al. ___________ May 24, 1960